H. L. BROWNBACK.
INTERNAL COMBUSTION ENGINE.
APPLICATION FILED JAN. 22, 1921.
1,399,001.
Patented Dec. 6, 1921.
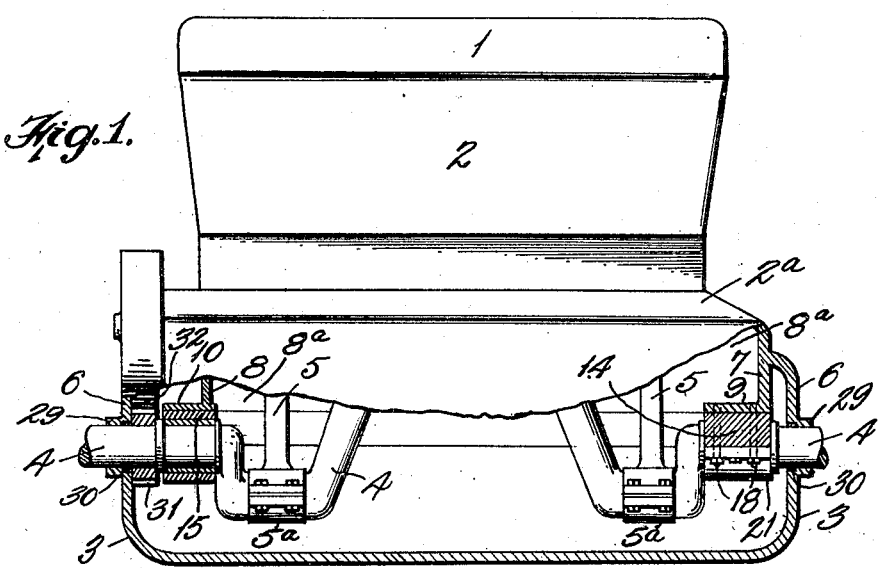
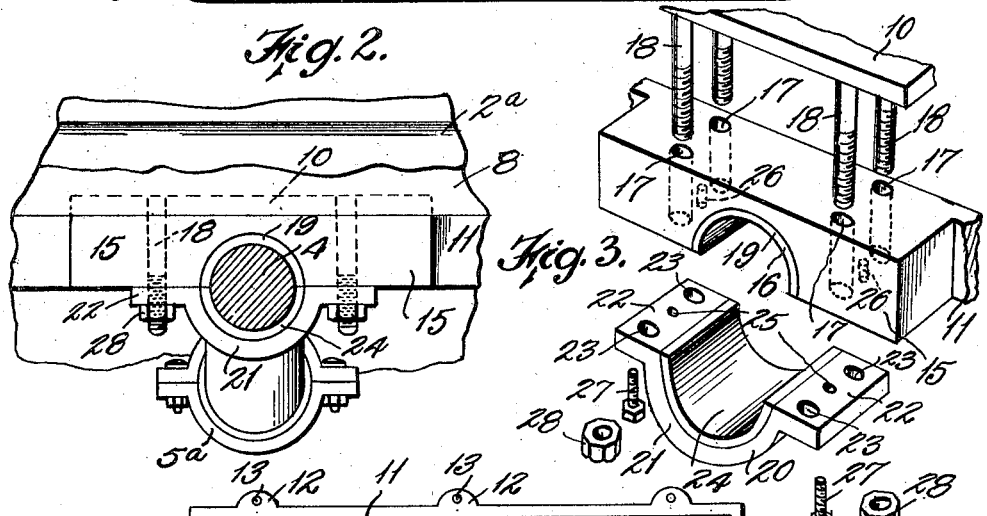
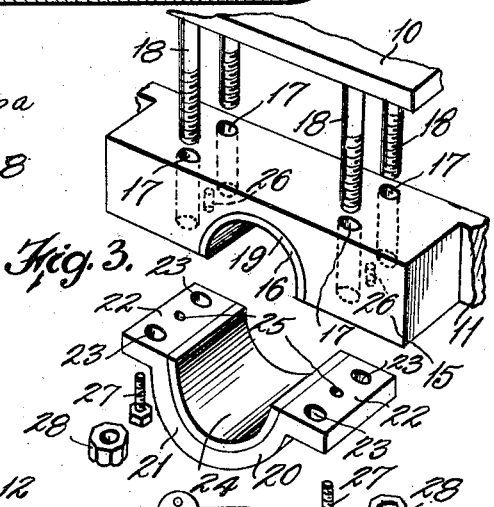
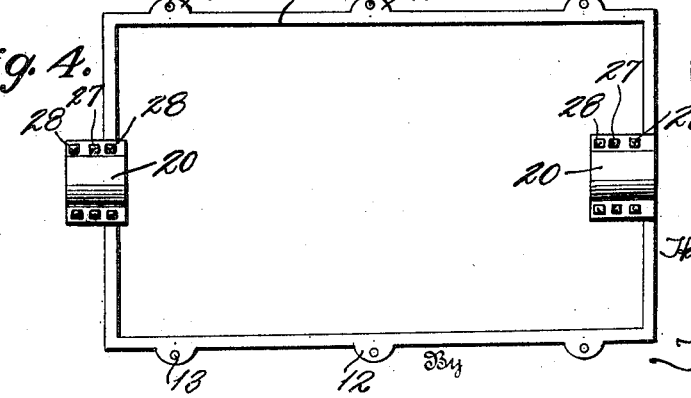

UNITED STATES PATENT OFFICE.

HENRY LOWE BROWNBACK, OF NORRISTOWN, PENNSYLVANIA, ASSIGNOR TO THE PREMIER MOTOR CORPORATION OF AMERICA, OF PHILADELPHIA, PENNSYLVANIA, A CORPORATION OF DELAWARE.

INTERNAL-COMBUSTION ENGINE.

1,399,001.        Specification of Letters Patent.      Patented Dec. 6, 1921.

Application filed January 22, 1921. Serial No. 439,231.

*To all whom it may concern:*

Be it known that I, HENRY L. BROWNBACK, a citizen of the United States, residing at Norristown, in the county of Montgomery and State of Pennsylvania, have invented certain new and useful Improvements in Internal-Combustion Engines, of which the following is a specification, reference being had therein to the accompanying drawing.

This invention relates to improvements in internal combustion engines, particularly in those parts of the structures which support the main crank shafts.

It is well known that heretofore all engines of this general class have been so designed that each comprised three principal stationary elements; namely, the block in which the cylinders are formed, the head, and the crank shaft casing. These parts are usually cast in form and then machined, at places, to provide smooth and true bearing surfaces for the several moving elements or their supports. The block or cylinder element is usually formed with an outwardly flaring apron at its bottom to form the upper portion of the casing which contains the cranks and crank shaft, the lower portion being a hollow casting which is secured to the apron.

In all of the structures with which I am familiar the main bearings for the engine shaft have been each formed in two parts; one part being in the apron of the block, and the other being in the lower element of the casing. Consequently, when one or more of these bearings became "burned" or scored because of faulty or insufficient lubrication, or when it became worn in ordinary use, it was not only necessary to remove the lower casing element, in order to be able to repair or replace the lower part of the bearing carried by it, but also necessary to repair or replace the upper part of the bearing while held rigidly in the block part of the engine from which it was not removable. This threw the entire engine out of use until the work of repairing, or the replacement of parts, could be completed.

And, again, if the main crank shaft was broken or cracked and another was required the lining of the new shaft in its bearings caused the entire engine to remain idle for an indefinite period.

One object of my invention is to provide a structure whose elements are so formed and related that the parts which carry the upper halves of the shaft bearings can, together with the lower halves, be readily and quickly detached from the engine, and other complete bearings with another carrier can be as quickly substituted. This avoids holding the entire engine idle for the making of repairs, as has heretofore been the case.

In the accompanying drawings:

Figure 1 is a side elevation of an engine structure embodying my improvements, some parts being broken away and others being shown in section.

Fig. 2 is an end elevation of one of the improved bearings, with the shaft shown in section.

Fig. 3 is a perspective of the several parts forming one of the bearings.

Fig. 4 is a bottom plan view of that portion of the engine structure which carries the bearings.

I have illustrated the invention as being embodied in an engine of the four cylinder class; but it will be understood that engines having any of the usual numbers of cylinders may be constructed with my invention incorporated therein without departing from its spirit or scope.

The three principal elements forming the engine are designated by 1, 2 and 3; 1 illustrating, conventionally, the head; 2, the block having the downwardly flaring apron $2^a$; and 3, the bottom part of the crank shaft casing, it and the apron inclosing the shaft 4 and the pistons 5. The crank pin bearings are indicated at $5^a$, $5^a$, they being of any suitable construction. The bottom part of the apron $2^a$ is formed with two walls, the outer wall being indicated by 6, 6, and the inner wall being indicated at one end by 7, and at the other end by 8; $8^a$ indicating one of the two side parts of this inner wall. The outer wall 6 projects downward a distance greater than do the inner walls 7 and 8 for a purpose to be described. The central part of each of the inner walls 7 and 8 is provided with horizontally extending flanges at 9 and 10 respectively. Because of the arrangement of parts in the interior of the casing I have found it desirable to project flange 9 inward and flange 10 outward from the inner walls 7 and 8.

11 is a rectangular frame structure having end bars and side bars rigidly joined or integral throughout. It is of such length and width that is upper edges will register with the lower edges of the parts 7 and 8 of the inner wall at the ends, and with the side parts 8ᵃ. The thickness of the bars or walls of the frame 11 is approximately the same as that of the inner walls 7, 8, and 8ᵃ. 12, 12 are ears formed at spaced intervals along the upper edges of the side walls and having apertures 13 adapted to receive small bolts for holding the frame in proper relation to the apron. At 14 and 15 the end bars of the frame 11 are enlarged or formed with heavy reinforces to serve as the upper parts of the shaft bearings. They are formed with semi-circular grooves 16, 16 and with bolt holes 17, 17, the latter adapted to receive depending bolts 18, 18 rigidly secured to the flanges 9 and 10. 19 is a part of a bushing of suitable metal in the semi-circular groove 16.

The other half of the bearing is the cap 20 having the shaft-supporting part 21 and the flanges 22, 22 with bolt holes 23, 23 registering with the bolt holes 17 and the bolts 18. 23 is a bushing element similar to that at 19 and placed in the part 21 of the cap 20.

In order to be able to secure the cap 20 to the frame part 11, without requiring that the latter be attached to the inner walls of the apron 2ᵃ, bolt holes 25, preferably of smaller diameter than those at 23, are formed in the flanges 22, and registering threaded apertures 26 are formed in the bearing metal 15; and bolts 27 are employed to hold the cap to the metal at 15 while the frame 11 and the bearings are being removed from, or put into place in the engine.

After the frame 11, with the assembled bearings, has been fitted to the inner walls 7, 8, 8ᵃ of the apron, it is fastened tightly in place by the nuts 28 engaging with the bolts 18; the ears and bolts at 12, 13 being utilized for holding the frame in correct position until the rigid binding is effected by the bolts 18 and their nuts.

At 29, 29 the outer walls 6 of the apron and the end walls of the bottom casing element are shaped to fit the shaft 4 so as to provide tight closures against the passage of dust or lubricant. Oil packing rings 30 are inserted to insure sufficient tightness for these purposes.

At 31 is shown a pinion on the crank shaft 4 which meshes with the gear wheel 32 for transmitting power to operate moving parts of the engine such as the timing and valve operating mechanisms.

The advantages incident to an engine having my improvements will be readily understood. When it is desired to get access to the interior of the casing, the bolts holding the lower element 3 are removed and it is taken off. Then the removable parts can be manipulated in the manner above indicated.

The element which supports the bearings, although simple in structure and light, holds them rigidly in proper relation to each other, and is separable with them as a unity. When it is necessary to either substitute a new crank shaft or a new part in either of the bearings this unitary structure can be taken out after removing a few nuts, and another, similar to it, with a new shaft mounted therein, or with new bearing elements, can be quickly inserted in its place. Such new shaft can be alined in the supporting frame 11, while the latter is detached from the engine, and previous to its being put in place.

Again, if the bearings or bushings are worn the work of substituting others either in the upper part of the bearing or in the lower part can be carried on at the bench without the necessity of lifting or handling the heavy engine.

A number of bearing carriers, similar to frame 11, each with its shaft and other parts complete are kept on hand, and immediately after one of them has been removed from an engine another is inserted and the engine is kept in operation.

It will be seen that the parts above referred to as an apron and a casing can be regarded as a support or frame for holding in proper relation the shaft, the pistons, the cylinders, and other parts; and in this respect there can be variations without departure from the invention.

What I claim is:

1. In a machine of the class described, the combination with the cylinders, the pistons, the crank shaft and the main frame structure which holds said parts in proper relations, of two bearings for the shaft and a supplemental frame or carrier for said bearings.

2. In a machine of the class described, the combination with the cylinders, the pistons, the crank shaft, and the main frame structure which holds said parts in proper relations, of two bearings for the shaft, and a supplementary frame or carrier for said bearing adapted to hold them permanently, and independently of the main frame, in fixed operative relations.

3. In a machine of the class described, the combination with the cylinders, the pistons, the crank shaft, and the main frame structure which holds said parts in proper relations, of two bearings for the shaft, each formed in two sections, of a supplemental frame or carrier rigidly secured to a section of each bearing and adapted to hold said sections permanently, independent of the main frame, in fixed operative relations.

4. In a machine of the class described, the combination with the cylinders, the pistons, the crank shaft, and the main frame structure which holds said parts in proper relations, of two bearings for the shaft, each formed in two separable sections, and a supplemental frame or carrier rigidly secured to one section of each bearing, and adapted to hold said sections permanently in fixed operative relations independently of the main frame structure, and having the separable sections of the bearings detachably secured thereto.

5. In a machine of the class described, the combination with the cylinders, the pistons, the crank shaft, and the main frame structure which hold said parts in operative relations, of two bearings for the shaft, and a supplemental frame or carrier for said bearings adapted to be held in predetermined fixed operative relation with the cylinders and the pistons, and adapted to permanently hold said bearings, independently of the main frame, in fixed operative relations.

In testimony whereof I affix my signature.

HENRY LOWE BROWNBACK.